(12) United States Patent
Peng et al.

(10) Patent No.: US 10,471,848 B2
(45) Date of Patent: Nov. 12, 2019

(54) ARCING FILTERING USING MULTIPLE IMAGE CAPTURE DEVICES

(71) Applicant: DTI Group Limited, Western Australia (AU)

(72) Inventors: En Peng, Western Australia (AU); William Hock Oon Lau, Western Australia (AU); Brett Adams, Western Australia (AU)

(73) Assignee: DTI GROUP LIMITED, Western Australia (AU)

( * ) Notice: Subject to any disclaimer, the term of this patent is extended or adjusted under 35 U.S.C. 154(b) by 232 days.

(21) Appl. No.: 15/105,228

(22) PCT Filed: Aug. 11, 2015

(86) PCT No.: PCT/AU2015/050453
§ 371 (c)(1),
(2) Date: Jun. 16, 2016

(87) PCT Pub. No.: WO2016/040997
PCT Pub. Date: Mar. 24, 2016

(65) Prior Publication Data
US 2016/0311342 A1  Oct. 27, 2016

(30) Foreign Application Priority Data

Sep. 15, 2014 (AU) ................. 2014903670

(51) Int. Cl.
*H04N 7/18* (2006.01)
*B60M 1/28* (2006.01)
(Continued)

(52) U.S. Cl.
CPC ............ *B60M 1/28* (2013.01); *G06T 7/0004* (2013.01); *G06T 7/593* (2017.01); *H04N 5/247* (2013.01);
(Continued)

(58) Field of Classification Search
CPC ...... H04N 5/247; H04N 7/181; H04N 13/271; H04N 13/296; B06M 1/28; G06T 7/593;
(Continued)

(56) References Cited

U.S. PATENT DOCUMENTS 6,404,484 B1 * 6/2002 Sogawa ................. G01C 3/085
356/3.14
6,985,619 B1 * 1/2006 Seta .................... G06K 9/00798
382/154

(Continued)

FOREIGN PATENT DOCUMENTS

EP        2431706 A1    3/2012
WO   2013104845 A2    7/2013

OTHER PUBLICATIONS

International Search Report for PCT/AU2015/050453 dated Sep. 2, 2015.

(Continued)

*Primary Examiner* — Michael Lee
(74) *Attorney, Agent, or Firm* — Pearne & Gordon LLP

(57) ABSTRACT

A system for detecting arcing between two electrical conductors includes an image capture arrangement including a plurality of image capture devices configured to be arranged in spaced relationship relative to one another and to a contact region between the electrical conductors so as to provide depth information. A processor is responsive to the image capture arrangement for computing a depth range of the contact region between the electrical conductors relative to a first image capture device of the image capture arrangement and determining if an arcing candidate appears within the computed depth range for the first image capture device of the image capture arrangement and at least one further (Continued)

image capture device of the image capture arrangement and, if it does, flagging the candidate as arcing at the contact region.

13 Claims, 3 Drawing Sheets

(51) Int. Cl.
*H04N 13/271* (2018.01)
*H04N 13/296* (2018.01)
*H04N 5/247* (2006.01)
*G06T 7/00* (2017.01)
*G06T 7/593* (2017.01)
*B60L 5/00* (2006.01)

(52) U.S. Cl.
CPC ............ *H04N 7/181* (2013.01); *H04N 13/271* (2018.05); *H04N 13/296* (2018.05); *B60L 5/00* (2013.01); *G06T 2207/10028* (2013.01)

(58) Field of Classification Search
CPC .................. G06T 7/0004; G06T 2207/10028; B06L 5/00
USPC ......... 348/47, 48, 49, 50, 73, 137, 148, 151, 348/153, 159, 207.1, 207.99, 208.1, 348/208.6, 208.16, 211.11, 231.99, 231.1, 348/231.2, 231.3, 231.9, 345, 372, 425.4, 348/500, 523, 567, 714, 716, 730, 820; 343/841, 906; 361/281, 520, 601; 386/201, 224
See application file for complete search history.

(56) References Cited

U.S. PATENT DOCUMENTS

| | | | | |
|---|---|---|---|---|
| 6,987,534 | B1* | 1/2006 | Seta ......................... | G01S 11/12 348/229.1 |
| 2003/0021591 | A1* | 1/2003 | Grosvenor ......... | H04N 5/23203 386/201 |
| 2004/0061712 | A1* | 4/2004 | Sogawa ................. | G01C 11/06 345/698 |
| 2008/0192110 | A1* | 8/2008 | Grover ............... | H04N 13/0055 348/47 |
| 2011/0001672 | A1* | 1/2011 | Harihara .............. | H01Q 1/2283 343/702 |
| 2013/0010079 | A1* | 1/2013 | Zhang ................ | H04N 13/0207 348/47 |
| 2013/0063601 | A1* | 3/2013 | Wakabayashi ............ | B60R 1/00 348/148 |
| 2013/0094705 | A1* | 4/2013 | Tyagi .................. | G06K 9/00369 382/103 |
| 2013/0300872 | A1* | 11/2013 | Park .......................... | B60R 1/00 348/148 |
| 2014/0267243 | A1* | 9/2014 | Venkataraman ....... | G06T 7/0065 345/419 |
| 2014/0307082 | A1* | 10/2014 | Chaki ...................... | G02B 7/04 348/87 |
| 2014/0354781 | A1* | 12/2014 | Matsuyama ....... | H04N 5/23212 348/49 |
| 2015/0035948 | A1* | 2/2015 | Cisi .................... | H04N 5/23296 348/47 |
| 2015/0123610 | A1* | 5/2015 | Zaki ....................... | B60L 3/0046 320/109 |

OTHER PUBLICATIONS

Written Opinion for PCT/AU2015/050453 dated Sep. 2, 2015.
Written Opinion of the International Preliminary Examining Authority PCT/AU2015/050453 dated Feb. 10, 2016.
Lalonde, J. R., 'Monocular Obstacle Detection for Moving Vehicles', thesis submitted to the faculty of graduate and postdoctoral studies in partial fulfilment of the requirements for the M.A. Sc. degree in Electrical and Computer Engineering, School of Information Technology and Engineering, Faculty of Engineering, University of Ottawa, 2011.
Supplementary European Search Report issued in Patent Application No. EP 15 84 1245 dated Jan. 19, 2018.
Aydin Ilhan, et al., "A Robust Anomaly Detection in Pantograph-Catenary System Based on Mean-Shift Tracking and Foreground Detection", 2013 IEEE International Conference on Systems, Man, and Cybernetics, IEEE, Oct. 13, 2013, pp. 4444-4449, XP032557576.

* cited by examiner

ARCING FILTERING USING MULTIPLE IMAGE CAPTURE DEVICES

CROSS-REFERENCE TO RELATED APPLICATIONS

This application is a national phase application under 35 U.S.C. 071 of International Application No PCT/AU2015/050453 filed 11 Aug. 2015, which claims the benefit of Australian Provisional Patent Application No 2014903670 filed on 15 Sep. 2014, the contents of which are incorporated herein by reference in their entirety.

TECHNICAL FIELD

This disclosure relates, generally, to the field of arcing detection and, more particularly, to a method of, and a system for, detecting arcing between two electrical conductors such as a power supply line and a conductive follower in electrical contact with the line. The disclosure has particular, but not necessarily exclusive, application to electric transportation vehicles powered via an overhead power line.

BACKGROUND

In monitoring an electrical system comprising an overhead power supply line and an electrically conductive follower, an image capture device may detect multiple arcing candidates. Some of these arcing candidates may be false positives arising from incident light on the system, ghosting, etc. In other words, some of the candidates are not arcs but artefacts arising due to other causes.

To filter out these false positives, a secondary image capture device can be employed using depth information. However, the computational cost is very high to compute a depth map from stereo images. In addition, where unsynchronised dual image capture devices are used rather than synchronised stereo image capture devices, traditional depth/disparity map computational algorithms will not work in scenarios where the detected arcing candidate is moving. In the particular application for which this system has been developed, the position of an arcing candidate can change in a very short space of time.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

In a first aspect, a method of detecting arcing between two electrical conductors includes computing a depth range of a contact region between the electrical conductors relative to a first image capture device of an image capture arrangement, the image capture arrangement comprising a plurality of image capture devices in spaced relationship relative to one another and to the contact region between the electrical conductors, the image capture devices being so arranged as to provide depth information; and determining if an arcing candidate appears within the computed depth range for a first image capture device of the image capture arrangement and at least one further image capture device of the image capture arrangement and, if it does, flagging the candidate as arcing at the contact region.

The image capture arrangement may comprise two unsynchronised image capture devices and the method may include arranging the image capture devices relative to the contact region in an epipolar manner.

The method may include bounding the electrical conductor in a virtual polyhedron, typically a rectangular cuboid, to determine the depth range of the contact region relative to the first image capture device. The method may include, knowing the depth range, computing possible locations of each arcing candidate on an image of the at least one further image capture device and, if any arcing candidate falls outside the computed depth range with respect to the at least one further image capture device, flagging only the, or each, remaining arcing candidate as an arcing incident.

In a second aspect, a system for detecting arcing between two electrical conductors includes an image capture arrangement comprising a plurality of image capture devices configured to be arranged in spaced relationship relative to one another and to a contact region between the electrical conductors so as to provide depth information; and a processor responsive to the image capture arrangement for computing a depth range of the contact region between the electrical conductors relative to a first image capture device of the image capture arrangement and determining if an arcing candidate appears within the computed depth range for the first image capture device of the image capture arrangement and at least one further image capture device of the image capture arrangement and, if it does, flagging the candidate as arcing at the contact region.

The image capture arrangement may comprise a plurality of unsynchronised image capture devices. The image capture arrangement may comprise a pair of image capture devices arranged, in use, in an epipolar manner relative to the contact region.

The system may include a data storage device for storing data from the processor for further analysis.

The disclosure extends also to an electric vehicle which includes an image capture arrangement mounted to the vehicle, the image capture arrangement comprising a plurality of image capture devices configured to be arranged in spaced relationship relative to one another and to a contact region between electrical conductors of a power supply system for providing power to the vehicle.

The image capture devices of the image capture arrangement may be arranged on the vehicle in an epipolar manner relative to the contact region.

The disclosure extends still further to software that, when installed in a computer, causes the computer to carry out the method described above.

BRIEF DESCRIPTION OF DRAWINGS

An embodiment of the disclosure is now described by way of example only with reference to the accompanying drawings in which.

DETAILED DESCRIPTION OF EXEMPLARY EMBODIMENTS

Figure 1:
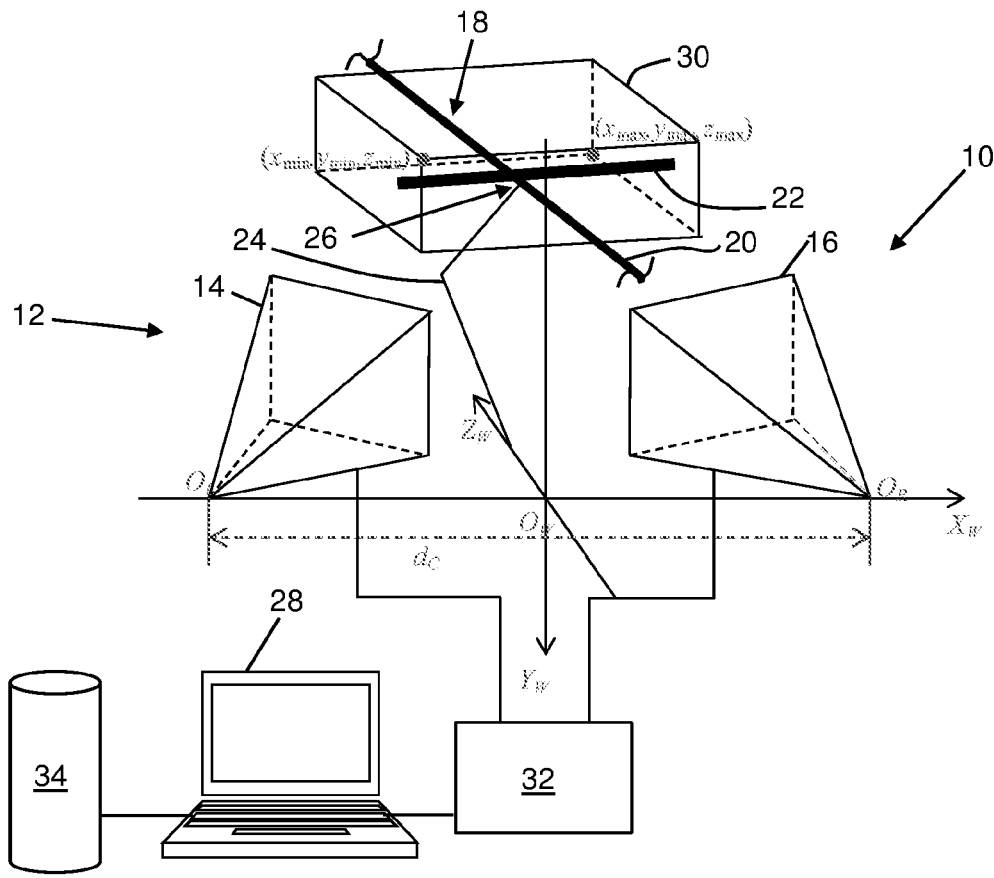
FIG. 1 shows a schematic, perspective view of an embodiment of a system for detecting arcing between two electrical conductors.
Figures 2, 3, 4:
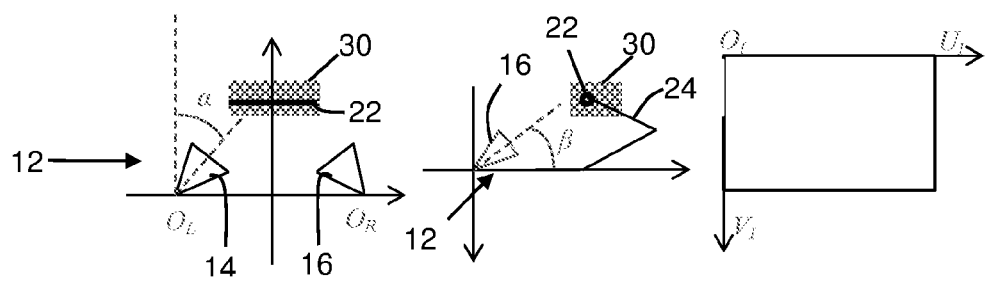
FIG. 2 shows a schematic plan view of a part of the system of FIG. 1.
FIG. 3 shows a schematic, side view of the part of the system of FIG. 1.
FIG. 4 shows an image coordinate system used by the system.
Figure 5:
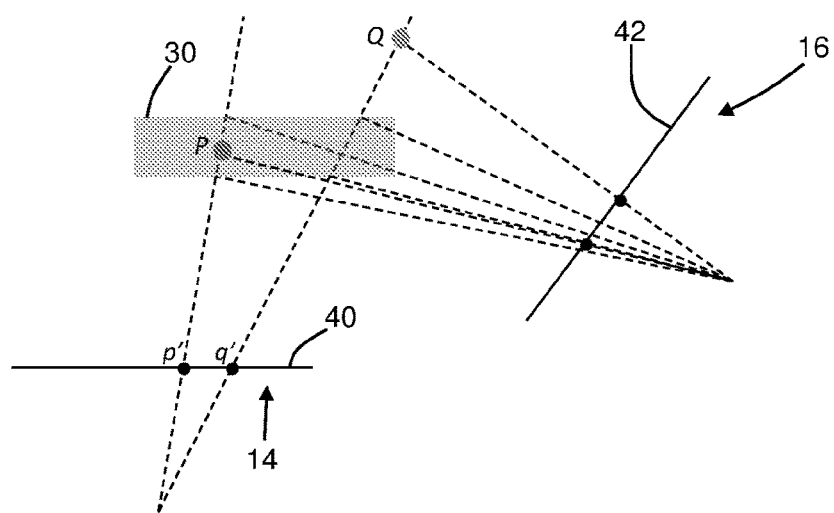
FIG. 5 shows a graphic representation of an embodiment of a method of detecting arcing between two electrical conductors.

In the drawings, reference numeral 10 generally designates an embodiment of a system for detecting arcing between two electrical conductors. The system 10 includes an image capture arrangement 12 comprising a plurality of image capture devices, or cameras, 14, 16. The cameras 14, 16 are digital video recorders (DVRs).

In one application, the system 10 is intended for detecting arcing between electrical conductors of a power supply 18 for an electric vehicle (not shown) of the type supplied with power via an overhead power supply line, indicated schematically at 20 in FIG. 1 of the drawings. Examples of such vehicles include trains, trams, or the like, which have a conductor 22 mounted on a follower, such as a pantograph 24, which follows a catenary of the power supply line 20. The conductor 22 is, for example, a carbon strip carried on the pantograph 24 and extends transversely relative to the power supply line 20 to accommodate relative lateral movement between the vehicle and the power supply line 20.

Where the conductor 22 makes contact with power supply line 20, a contact region 26 is defined.

The cameras 14 and 16 of the image capture arrangement 12 are arranged in an epipolar manner relative to the contact region 26 to obtain depth information as will be described in greater detail below. The camera 14 is a first, or main, camera and the camera 16 is a second, or secondary, camera.

The system 10 includes a processor, illustrated schematically as a computer 28 in FIG. 1 of the drawings. The processor 28 is responsive to the image capture arrangement 12 for computing a depth range 30 of the contact region 26 between the electrical conductors 20, 22 relative to the main camera 14 of the image capture arrangement 12. The depth range 30 is implemented as a virtual polyhedron, typically a rectangular cuboid.

The processor 28 is further configured to determine if an arcing candidate appears within the computed depth range 30 for the main camera 14 of the image capture arrangement 12 and the secondary camera 16 of the image capture arrangement 12.

The system 10 includes a receiver module 32 for receiving data from the cameras 14, 16 of the image capture arrangement 12 and for feeding the data to the processor 28. While the components 14, 16, 30 and 32 are illustrated in FIG. 1 as being hardwired, this is for illustrative purposes only. It will be appreciated that some of the components could communicate wirelessly with each other. For example, the cameras 14, 16 could communicate wirelessly with the receiver module 32 with the receiver module 32 being hardwired to the processor 28. Instead, the receiver module 32 could communicate wirelessly with the processor 28 as well.

Various other connectivity combinations will be readily apparent to a person of ordinary skill in the art. In other embodiments, the receiver module 32 could be an on-board, removable memory device associated with each of the cameras 14, 16. The cameras 14, 16 may store their information on board via the removable memory devices and the memory devices could be removed for later analysis of the data.

The system 10 also includes a data storage device 34 in which data output by the processor 28 are stored for analysis.

Figure 6:
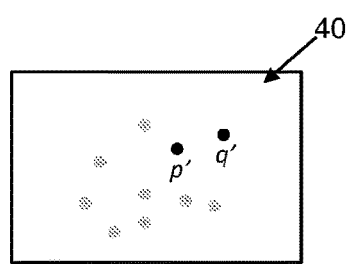
FIG. 6 shows a schematic representation of an image of two arcing candidates detected by a first image capture device of the image capture arrangement of the system.
Figure 8:
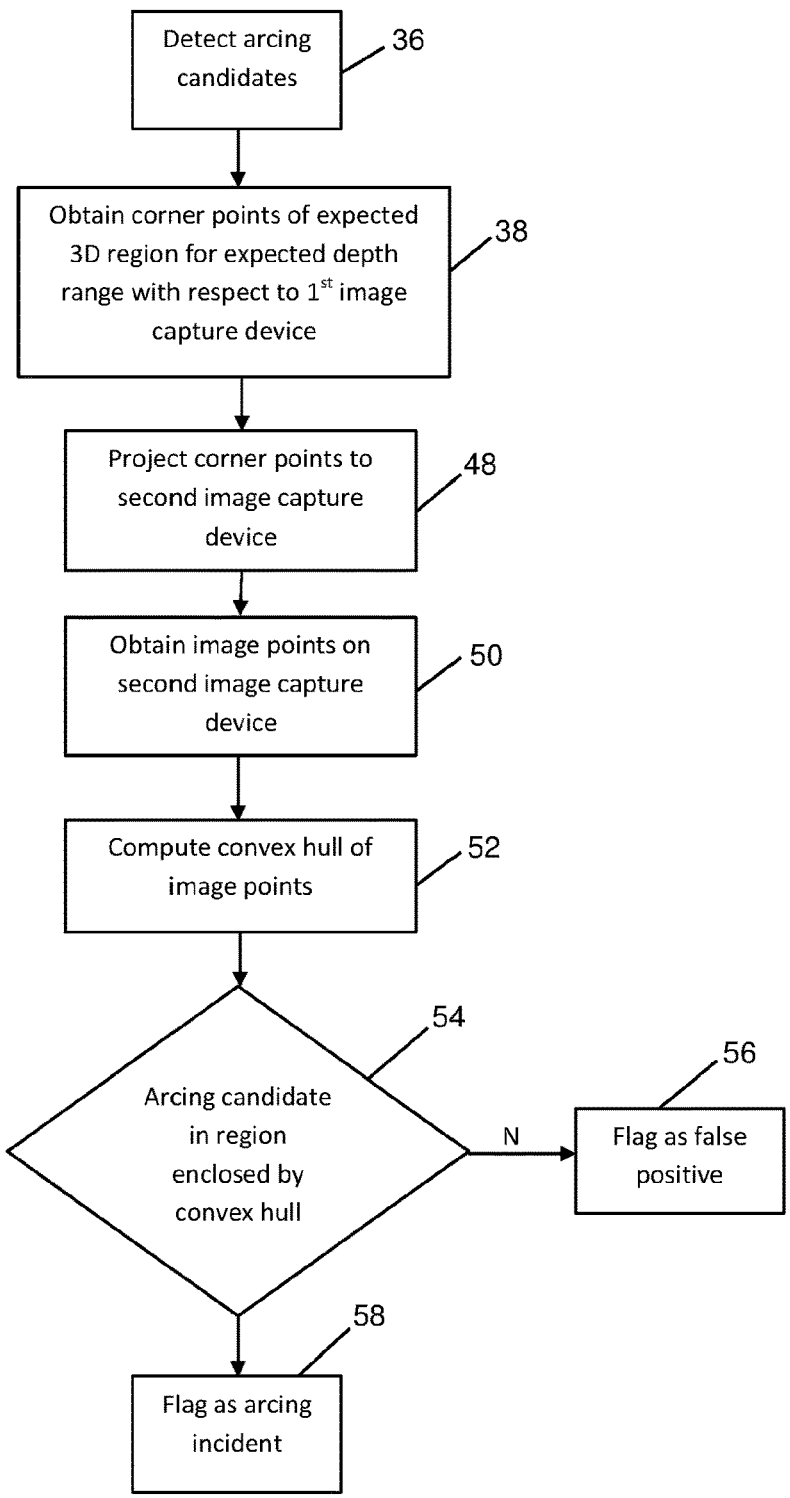
FIG. 8 shows a flow chart setting out the computational steps involved in the method of detecting arcing between two electrical conductors.

In use, initially, arcing candidates P and Q (FIG. 6) are detected by the cameras 14, 16 as shown at step 36 in FIG. 8 of the drawings.

The virtual polyhedron representative of the depth range 30 is generated about the conductor 22. The polyhedron 30 is generated by knowing the position in three-dimensional (3D) space of the conductor 22 relative to the power supply line 20. Also, arcing to be detected will only occur where the conductor 22 makes contact with the power supply line 20. Based on this, the depth range between the contact region 26 and the main camera 14 is generated as the polyhedron 30. $X_{min}$, $Y_{min}$, and $Z_{min}$ (FIG. 1) represent the closest point in 3D space of the polyhedron 30 relative to the main camera 14 and, conversely, $X_{max}$, $Y_{max}$ and $Z_{max}$ represent the furthest point in 3D space of the polyhedron 30 relative to the main camera 14. This is shown at step 38 in FIG. 8 of the drawings.

Figure 7:
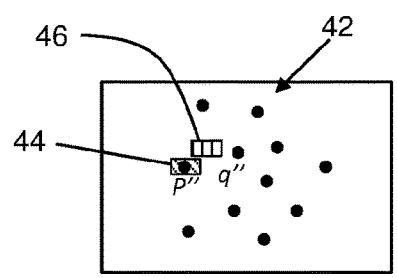
FIG. 7 shows a schematic representation of an image of the arcing candidates detected by a second image capture device of the image capture arrangement.

With the depth information provided by the polyhedron 30, the 3D positions of arcing candidates P and Q are available to the main camera 14. The arcing candidates P and Q project to p' and q' in an image 40 (FIG. 6) of the main camera 14 and to p" and q" on an image 42 (FIG. 7) of the secondary camera 16.

Having the first camera image 40 and the expected depth range 30, the possible locations of each of the arcing candidates P and Q on the image 42 of the secondary camera 16 can be computed using epipolar geometry. The expected projection of each arcing candidate P and Q appears as a line segment 44 (represented by the rectangle with diagonal hatching) and 46 (represented by the rectangle with vertical hatching) in an epipolar line (not shown) in the image 42, respectively.

In the illustrated example, the projection q" of the arcing candidate Q falls outside its projected, expected depth range as represented by the line segment 46 in the image 42. As such, it is determined that arcing candidate Q is not arcing but is, instead, a false positive arising from, for example, incident light artefacts, or the like.

In greater detail, for each camera 14, 16, the projection of a 3D point in the world coordinate system can be computed as:

$$[u, v, 1]^T = P[x, y, z, 1]^T$$

$$P = K[R_X R_Y | -R_X R_Y T],$$

where $K = \begin{bmatrix} f_u & 0 & 0.5w \\ 0 & f_v & 0.5h \\ 0 & 0 & 1 \end{bmatrix}$, $R_X = \begin{bmatrix} 1 & 0 & 0 \\ 0 & \cos\beta & -\sin\beta \\ 0 & \sin\beta & \cos\beta \end{bmatrix}$, $R_Y = \begin{bmatrix} \cos\alpha & 0 & \sin\alpha \\ 0 & 1 & 0 \\ -\sin\alpha & 0 & \cos\alpha \end{bmatrix}$ and $T = \begin{bmatrix} t_X \\ 0 \\ 0 \end{bmatrix}$.

Given an image point, its 3D position can be obtained if the depth ("z" in world coordinate system) is specified by:

$$[x, y, z, 1]^T = P_z^{-1}[u, v, 1, 1]^T$$
$$P^{-1} = T^{-1} R_Y^{-1} R_X^{-1} K^{-1},$$

where $T^{-1} = \begin{bmatrix} z & 0 & 0 & -t_X \\ 0 & z & 0 & 0 \\ 0 & 0 & z & 0 \\ 0 & 0 & 0 & 1 \end{bmatrix}$, $R_Y^{-1} = \begin{bmatrix} \cos\alpha & 0 & -\sin\alpha & 0 \\ 0 & 1 & 0 & 0 \\ \sin\alpha & 0 & \cos\alpha & 0 \\ 0 & 0 & 0 & 1 \end{bmatrix}$, $R_X^{-1} = \begin{bmatrix} 1 & 0 & 0 & 0 \\ 0 & \cos\beta & \sin\beta & 0 \\ 0 & -\sin\beta & \cos\beta & 0 \\ 0 & 0 & 0 & 1 \end{bmatrix}$ and $K^{-1} = \begin{bmatrix} f_u^{-1} & 0 & 0 & -0.5w \\ 0 & f_v^{-1} & 0 & -0.5h \\ 0 & 0 & 1 & 0 \\ 0 & 0 & 0 & 1 \end{bmatrix}$ For each arcing candidate located at $p_{left}(u_L, v_L)$ on the main image, with expected depth ranging between $[Z_{min}, Z_{max}]$, and expected inter-frame movement $[\Delta x, \Delta y]$, the following process is effected to determine if it is a false positive.

The eight corner points $(M_1, M_2, \ldots, M_8)$ of the expected 3D region (i.e. the virtual polyhedron representative of the depth range 30) can be obtained as:

$$\begin{bmatrix} 1 & 0 & 0 & \pm\Delta x \\ 0 & 1 & 0 & \pm\Delta y \\ 0 & 0 & 1 & 0 \\ 0 & 0 & 0 & 1 \end{bmatrix} Q_z \text{ where } Q_z = P_{left,z}^{-1}[u, v, 1, 1]^T$$

where $z = z_{min}$ and $z_{max}$

As shown at step 48 in FIG. 8 of the drawings, the corner points of the virtual polyhedron representative of the depth range 30 are projected on to the image 42 of the secondary camera 16. Projecting these eight corner points to the secondary camera 16 obtains eight image points (step 50 in FIG. 8):

$$p_{right,i} = PM_i (i=1,2,\ldots,8)$$

In step 52, the convex hull bounding the points $p_{right,1}, p_{right,2}, \ldots, p_{right,8}$ is computed.

The processor 28 determines if there are any possible arcing candidates within the image region enclosed by the convex hull at step 54. As indicated above, in the illustrated embodiment, the processor 28 has computed that the projection q" of the arcing candidate Q falls outside the depth range as represented by the line segment 46 in the image 42 of the secondary camera 16. As a result, the processor 28 flags the arcing candidate Q as a false positive as shown at step 56 in FIG. 8

Conversely, the projection p" of the arcing candidate P falls within its projected depth range as represented by the line segment 44 in the image 42 of the secondary camera 16. The processor 28 therefore flags the arcing candidate P as an arcing incident as shown at step 58 in FIG. 8.

As described above, an application of the system 10 is its use in monitoring the overhead power supply line 20 and the conductor 22 carried on the pantograph 24 of the vehicle to detect arcing. Arcing can occur due to numerous factors, for example, incorrect or inadequate tensioning of the overhead power supply line 20, inadequate maintenance of the conductor 22, or the like. The system 10 enables arcing to be detected and monitored to enable remedial action to be taken.

In other systems requiring depth information of which the Applicant is familiar, stereo images are used. However, the computational cost to compute a depth map from stereo images is very high. With the system 10 of the present disclosure, it is not necessary to do block/feature matching between the main image 40 and the secondary image 42. For each arcing candidate in the main image 40, it is only necessary to compute eight corner 3D points which enclose the region in which arcing could possibly occur and project those eight corner points on to the secondary image 42. This simply involves direct matrix multiplication resulting in far lower computational costs and data bandwidths.

It is a further advantage of the described disclosure that a system 10 is provided which is robust and relatively low cost. Unsynchronised dual cameras 14, 16 are used rather than synchronised, stereo cameras. However, the use of separate, unsynchronised cameras means that traditional depth/disparity map computation algorithms cannot be used if the object being monitored is moving which can occur, in the case of overhead power supply line/pantograph mounted conductor assemblies in a very short space of time.

It is therefore yet a further advantage of the described system 10 that it is possible to relax the 3D region slightly to accommodate frame rates, vehicle speeds, etc. The only effect of this is to enlarge the search region (the line segments 44 and 46) slightly on the secondary image 42 without significantly impacting on computational costs.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. A method of detecting electrical arcing between two contacting electrical conductors, the method including:
    arranging an image capture arrangement comprising a plurality of image capture devices in spaced relationship relative to one another and in spaced relationship relative to a contact region between the two contacting electrical conductors, the image capture devices being so arranged as to provide depth information;
    detecting arcing candidates between the two contacting electrical conductors using the plurality of image capture devices;
    computing a depth range of a contact region between the two contacting electrical conductors relative to a first image capture device of an image capture arrangement;
    determining if an electrical arcing candidate appears within the computed depth range for the first image capture device of the image capture arrangement and the computed depth range as projected relative to at least one further image capture device of the image capture arrangement; and
    if it does, flagging the candidate as electrical arcing at the contact region.

2. The method of claim 1 in which the image capture arrangement comprises two unsynchronised image capture devices and in which the method includes arranging the image capture devices relative to the contact region in an epipolar manner.

3. The method of claim 1 which includes bounding the electrical conductor in a virtual polyhedron to determine the depth range of the contact region relative to the first image capture device.

4. The method of claim 3 which includes, knowing the depth range, computing possible locations of each electrical arcing candidate on an image of the at least one further image capture device and, if any electrical arcing candidate falls outside the computed depth range with respect to the at least one further image capture device, flagging only the, or each, remaining electrical arcing candidate as an electrical arcing incident.

5. A system for detecting electrical arcing between two contacting electrical conductors, the system including:
    an image capture arrangement comprising a plurality of image capture devices configured to be arranged in spaced relationship relative to one another and to a contact region between the two contacting electrical conductors so as to provide depth information; and
    a processor responsive to the depth information provided by the image capture arrangement for:
        computing a depth range of the contact region between the two contacting electrical conductors relative to a first image capture device of the image capture arrangement, and
        determining if an electrical arcing candidate appears within the computed depth range for the first image capture device of the image capture arrangement and at least one further image capture device of the image capture arrangement, and, if an electrical arcing candidate does appear,
        flagging the candidate as electrical arcing at the contact region.

6. The system of claim 5 in which the image capture arrangement comprises a plurality of unsynchronised image capture devices.

7. The system of claim 6 in which the image capture arrangement comprises a pair of image capture devices arranged, in use, in an epipolar manner relative to the contact region.

8. The system of claim 5 which includes a data storage device for storing data from the processor for further analysis.

9. An electric vehicle which includes:
    two contacting electrical conductors of a contacting system for providing power to the vehicle;
    an image capture arrangement mounted to the vehicle, the image capture arrangement comprising a plurality of image capture devices arranged in spaced relationship relative to one another and in spaced relationship relative to the contact region between the two contacting electrical conductors so as to provide depth information, and
    a processor responsive to the depth information provided by the image capture arrangement, the processor being configured to:
        compute a depth range of the contact region between the two contacting electrical conductors relative to a first image capture device of the image capture arrangement;
        determine if an electrical arcing candidate appears within the computed depth range for the first image capture device of the image capture arrangement and at least one further image capture device of the image capture arrangement, and, if an electrical arcing candidate does appear,
        flag the candidate as electrical arcing at the contact region.

10. The electric vehicle of claim 9 in which the image capture devices of the image capture arrangement are arranged on the vehicle in an epipolar manner relative to the contact region.

11. A non-transitory machine-readable medium with instructions that, when executed, carry out the method of claim 1.

12. The method of claim 1, wherein the computing the depth range of the contact region between the two contacting electrical conductors relative to the first image capture device of the image capture arrangement comprises generating a virtual polyhedron using a position of one of the two contacting electrical conductors relative to the other one of the two contacting electrical conductors.

13. The electric vehicle of claim 9, wherein the processor is further configured to compute the depth range of the contact region between the two contacting electrical conductors relative to the first image capture device of the image capture arrangement by generating a virtual polyhedron using a position of one of the two contacting electrical conductors relative to the other one of the two contacting electrical conductors.

* * * * *